US010116976B2

United States Patent
Shaw et al.

(10) Patent No.: US 10,116,976 B2
(45) Date of Patent: Oct. 30, 2018

(54) SYSTEM AND METHOD FOR DISTRIBUTING MEDIA CONTENT ASSOCIATED WITH AN EVENT

(71) Applicant: AT&T INTELLECTUAL PROPERTY I, L.P., Atlanta, GA (US)

(72) Inventors: Venson Shaw, Kirkland, WA (US); Jin He, Fremont, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/884,229

(22) Filed: Oct. 15, 2015

(65) Prior Publication Data

US 2017/0111667 A1      Apr. 20, 2017

(51) Int. Cl.
*H04N 21/2387* (2011.01)
*H04N 21/218* (2011.01)
(Continued)

(52) U.S. Cl.
CPC ......... *H04N 21/2387* (2013.01); *H04N 7/163* (2013.01); *H04N 7/17318* (2013.01);
(Continued)

(58) Field of Classification Search
CPC ......... H04N 21/2387; H04N 21/21805; H04N 21/2187; H04N 21/25435;
(Continued)

(56) References Cited

U.S. PATENT DOCUMENTS 6,124,862 A    9/2000 Boykon et al.
6,496,980 B1   12/2002 Tillman et al.
(Continued)

FOREIGN PATENT DOCUMENTS

EP   1049096 B1   7/2012
WO   0060590 A1   10/2000
(Continued)

OTHER PUBLICATIONS

Kastrenakes, J., "Google+ Hangouts updated with live rewind and instant replay,"The Verge, theverge.com, May 7, 2013, http://www.theverge.com/2013/5/7 /4309492/google-hangouts-update-liverewind-i nstant-record ing-replay-youtube, 2 pages.
(Continued)

*Primary Examiner* — Randy A Flynn
(74) *Attorney, Agent, or Firm* — Toler Law Group, PC

(57) ABSTRACT

A device includes a processor and a memory storing instructions that, when executed by the processor, cause the processor to perform operations including receiving, via a transmission, a first set of video segments. Each video segment of the first set of video segments includes multiple video frames of a video stream associated with an event. The operations also include sending a replay request for data associated with a particular video stream associated with the event. The replay request is associated with a replay duration. A communication session with a media server is established via a unicast transmission based on the replay request. The operations also include receiving, via the communication session, a second set of video segments associated with the particular video stream and automatically terminating the communication session based on the replay duration.

20 Claims, 8 Drawing Sheets

(51) Int. Cl.
  *H04N 21/2187* (2011.01)
  *H04N 21/2543* (2011.01)
  *H04N 21/262* (2011.01)
  *H04N 21/472* (2011.01)
  *H04N 21/658* (2011.01)
  *H04N 21/6587* (2011.01)
  *H04N 21/8352* (2011.01)
  *H04N 21/845* (2011.01)
  *H04N 7/16* (2011.01)
  *H04N 7/173* (2011.01)

(52) U.S. Cl.
  CPC ... *H04N 21/2187* (2013.01); *H04N 21/21805* (2013.01); *H04N 21/25435* (2013.01); *H04N 21/26233* (2013.01); *H04N 21/47202* (2013.01); *H04N 21/6581* (2013.01); *H04N 21/6587* (2013.01); *H04N 21/8352* (2013.01); *H04N 21/8456* (2013.01)

(58) Field of Classification Search
  CPC ....... H04N 21/26233; H04N 21/47202; H04N 21/6581; H04N 21/6587; H04N 21/8352; H04N 21/8456; H04N 7/163; H04N 7/17318
  See application file for complete search history.

(56) References Cited

U.S. PATENT DOCUMENTS

| | | | |
|---|---|---|---|
| 6,765,565 B2 | 7/2004 | Sayers et al. | |
| 6,993,788 B1 | 1/2006 | Lawrence et al. | |
| 7,448,063 B2 | 11/2008 | Freeman et al. | |
| 7,509,021 B2 | 3/2009 | Mughal et al. | |
| 7,587,214 B2 | 9/2009 | Inselberg | |
| 7,593,687 B2 | 9/2009 | Anderson, Jr. et al. | |
| 7,657,920 B2* | 2/2010 | Arseneau | H04N 21/234354 725/133 |
| 7,876,353 B2 | 1/2011 | Piccionelli et al. | |
| 8,391,773 B2 | 3/2013 | Arseneau et al. | |
| 8,391,774 B2 | 3/2013 | Arseneau et al. | |
| 8,401,460 B2 | 3/2013 | Ortiz et al. | |
| 8,610,786 B2 | 12/2013 | Ortiz | |
| 8,874,778 B2 | 10/2014 | Xu et al. | |
| 8,909,201 B2 | 12/2014 | O'Neil | |
| 9,007,432 B2 | 4/2015 | Chuang et al. | |
| 9,055,271 B2 | 6/2015 | Verna et al. | |
| 9,077,866 B2 | 7/2015 | Aagaard et al. | |
| 2001/0051516 A1* | 12/2001 | Nakamura | H04N 21/4586 455/412.1 |
| 2002/0069419 A1 | 6/2002 | Raverdy et al. | |
| 2002/0108125 A1* | 8/2002 | Joao | H04N 21/472 725/139 |
| 2002/0124258 A1* | 9/2002 | Fritsch | H04N 21/6408 725/88 |
| 2002/0124262 A1* | 9/2002 | Basso | H04N 21/4381 725/109 |
| 2003/0204630 A1 | 10/2003 | Ng | |
| 2005/0028219 A1 | 2/2005 | Atzmon et al. | |
| 2006/0291817 A1* | 12/2006 | Mughal | H04N 21/4307 386/345 |
| 2007/0067807 A1* | 3/2007 | O'Neil | H04N 21/25825 725/62 |
| 2007/0130597 A1* | 6/2007 | Parker | H04N 21/21 725/94 |
| 2008/0043089 A1 | 2/2008 | Auerbach et al. | |
| 2008/0062318 A1* | 3/2008 | Ellis | H04N 21/4532 348/564 |
| 2009/0017749 A1 | 1/2009 | Braun | |
| 2009/0037962 A1* | 2/2009 | Benco | H04N 21/6587 725/88 |
| 2009/0157480 A1* | 6/2009 | Smith | G06F 17/30035 705/59 |
| 2010/0110195 A1 | 5/2010 | Mcintosh | |
| 2011/0264530 A1 | 10/2011 | Santangelo et al. | |
| 2011/0276880 A1* | 11/2011 | Greenfield | H04N 21/26616 715/720 |
| 2012/0093481 A1* | 4/2012 | McDowell | H04N 21/44218 386/241 |
| 2013/0086615 A1* | 4/2013 | Williams | H04N 21/41407 725/62 |
| 2014/0126881 A1* | 5/2014 | Yoneda | H04N 21/2743 386/241 |
| 2015/0052546 A1 | 2/2015 | Ortiz et al. | |
| 2015/0143395 A1 | 5/2015 | Reisman | |
| 2015/0213316 A1 | 7/2015 | Vunic et al. | |

FOREIGN PATENT DOCUMENTS

| | | |
|---|---|---|
| WO | 0077999 A2 | 12/2000 |
| WO | 2014152695 A1 | 9/2014 |

OTHER PUBLICATIONS

Kato, K., "Skillz Brings Live Streaming and Instant Replays Streaming Options to Mobile eSports", Sport Techie, sporttechie.com, May 16, 2015,, http://www.sporttechie.com/2015/05/16/skil lz-brings-livestreaming-a ndinstant-replays-streaming-options-to-mobile-esports/, 2 pages.

Simmons, D., "Instant replays to fans'phones tested at FA Cup Final", BBC News, bbc.com, May 30, 2015, http://www.bbc.com/news/technology-32934087, 16 pages.

Singer, N., "Stand Up and Cheer, but Hit 'Pause' First", The New York Times, nytimes.com, Mar. 2, 2013, http://www.nytimes.com/2013/03/03/technology /multiple-video-feeds-give-arena-fans-the-comforts-of-home.html?_r=O, 2 pages.

Woollaston, V., "Instant replays streamed straight to your phone: App broadcasts action from sporting events from multiple angles on a mobile", Daily Mail, dailymail.co.uk, Jun. 1, 2015,, http://www.dailymail.co.uk/sciencetech/article-3105548/Instant-replaysstreamed-straight-phone-App-broadcasts-action-sporting-events-multipleangles-mobile.html, 18 pages.

* cited by examiner

SYSTEM AND METHOD FOR DISTRIBUTING MEDIA CONTENT ASSOCIATED WITH AN EVENT

FIELD OF THE DISCLOSURE

The present disclosure is generally related to distributing media content associated with an event.

BACKGROUND

Events of public interest (such as sporting events, plays, speeches, concerts, etc.) are often performed in large venues (such as stadiums, auditoriums, etc.) in order to accommodate a live audience. Many of these events are also transmitted, e.g., as televised events, for consumption by viewers who are not present at the event. Such televised events often combine views from different cameras to capture various aspects of the event. Many televised events also have enhancing features, such as "instant replay". While the live audience at the event may not have ready access to various viewing angles or replay, the live audience has the benefit of the live experience and interaction with other members of the live audience.

DETAILED DESCRIPTION

Figure 1:
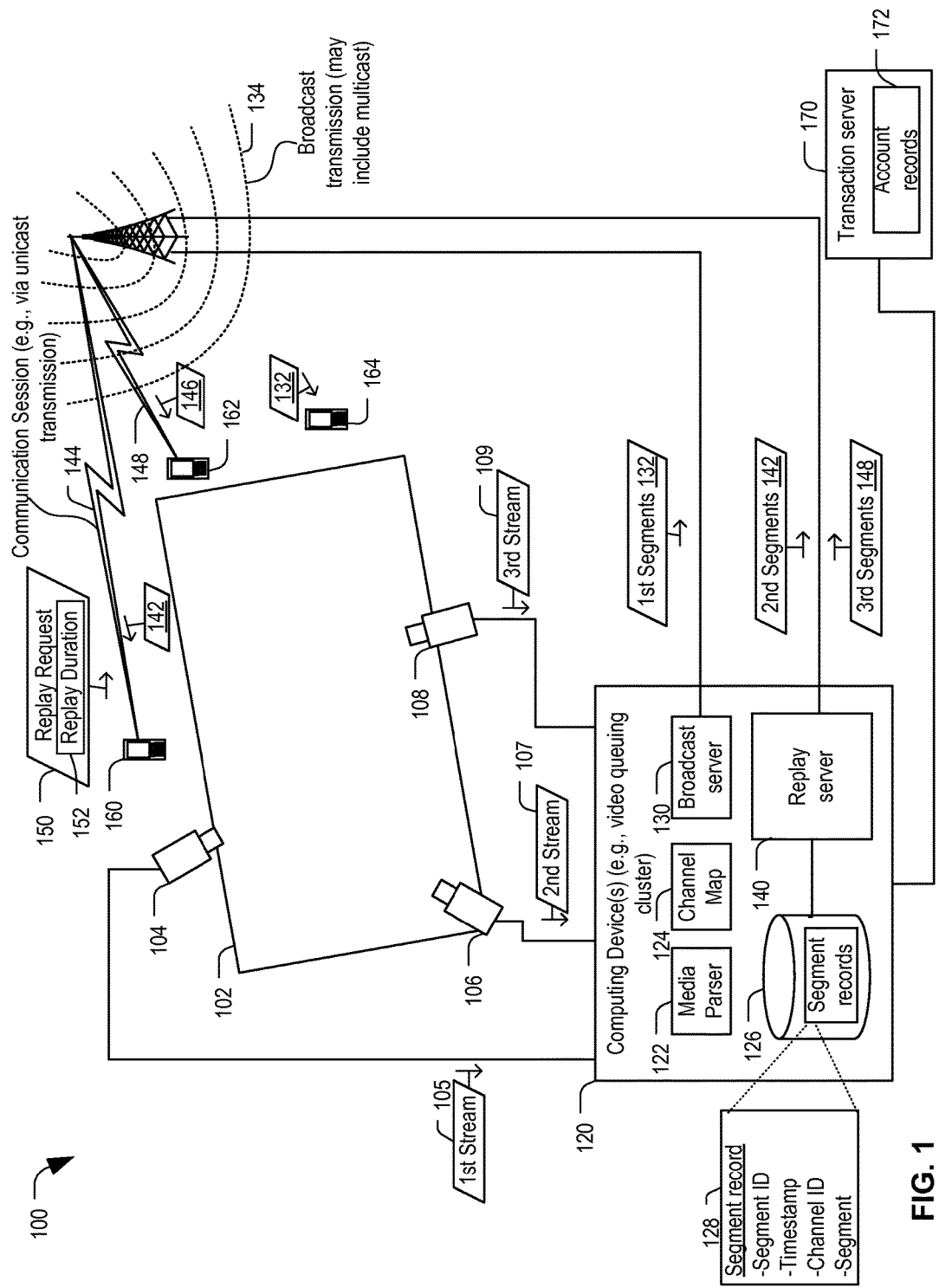
FIG. 1 is a diagram of a particular example of a system for distributing media content associated with an event.

The present disclosure describes systems and methods of distributing media content associated with an event to audience members at the event (e.g., members of an audience that are at a venue at which the event is occurring). In a particular example, the media content includes multiple video streams, where each video stream may correspond to a particular camera angle or to multiple camera angles associated with the event. The media content may be transmitted wirelessly such that it is available to at least some of the audience members (e.g., to audience members that have been granted access rights to the media content). The media content may include live (or substantially real-time) media content, replay media content, or both. An audience member may use a portable playback device, such as a mobile phone, to access the media content, to select media content for playback, etc.

In a particular implementation, a device (such as a mobile phone) includes a processor and a memory accessible to the processor. The memory stores instructions that, when executed by the processor, cause the processor to perform operations that enable an audience member at an event to access and playback media content associated with the event. For example, the operations may include receiving, via a transmission, a first set of video segments including multiple video frames of a video stream associated with the event. The operations may also include sending a replay request for video data associated with a particular video stream associated with the event. The replay request is associated with a replay duration. For example, the replay duration may indicate a playback time of the requested data. A communication session with a media server may be established via a unicast transmission based on the replay request. The operations may also include receiving, via the communication session, a second set of video segments associated with the particular video stream and automatically terminating the communication session based on the replay duration. After terminating the communication session, the device may, for example, resume receiving video segments via the transmission.

In another implementation, a method includes receiving, at a computing device (e.g., a media server, such as a device of a video queuing cluster), multiple video streams associated with an event and parsing the multiple video streams to form a plurality of video segments including multiple video frames of a video stream. The method may also include causing a first set of video segments to be transmitted via a transmission. For example, the first set of video segments may include media content that is transmitted to enable attendees at the event to access and playback media content associated with the event. The method may also include receiving, from a user device (associated with an attendee at the event), a replay request for video data associated with a particular video stream of the multiple video streams. The method may further include initiating, based on the replay request, a communication session with the user device via a unicast transmission and causing a second set of video segments to be transmitted via the communication session to the user device. The method may also include automatically terminating the communication session with the user device responsive to completing transmission of the second set of video segments. The transmission of the first set of video segments may continue while the communication session is being used to transmit the second set of video segments. Accordingly, while the communication session is in use and after the communication session is terminated, attendees at the event may continue to have access to the media content of the first set of video segments.

In yet another implementation, a computer-readable storage device stores instructions that are executable by a processor to cause the processor to perform operations including causing a first set of video segments to be transmitted via a wireless transmission. For example, the instructions may be executed by a media server that causes a wireless network to transmit the first set of video segments. Each video segment of the first set of video segments may include multiple video frames of a first video stream associated with an event. The operations may also include receiving, from a user device, a replay request for video data of a second video stream associated with the event. For example, the user device may include or correspond to a mobile computing device (e.g., a phone or tablet computer) of a user attending the event. The replay request may be associated with a replay duration. For example, the replay duration may indicate a playback time of the requested data. The operations may further include initiating, based on the replay request, a communication session with the user device via a wireless unicast transmission. The operations may also include causing a second set of video segments to be transmitted via the communication session to the user device, where the second set of video segments are derived from the second video stream. The operations further include automatically terminating the communication session with the user device responsive to satisfying the replay duration. The transmission of the first set of video segments may continue while the communication session is being used to transmit the second set of video segments. Accordingly, while the communication session is in use and after the communication session is terminated, attendees at the event may continue to have access to the media content of the first set of video segments.

FIG. 1 is a diagram of a particular example of a system 100 to distribute media content to enable members of a live audience of an event to access multiple views of the event. Additionally or in the alternative, the system 100 may enable members of the live audience to access a replay of media content associated with the event. For example, a member of the live audience may be associated with a user device, such as one of representative user devices 160, 162, 164, each of which may include or correspond to a mobile communication device (e.g., a mobile phone, a tablet computer, a laptop computer, etc.). As described with reference to FIG. 10, each user device 160, 162, 164 may include a processor and a memory accessible to the processor. The memory may store instructions (such as a media access and playback application) that are executable by the processor to cause the processor to access and display media content of the event, which may include accessing replays of the event, as described further below.

In FIG. 1, the event occurs at a venue 102, such as a stadium or an auditorium. Multiple cameras 104, 106 and 108 are positioned around the venue 102, such that each camera can capture a corresponding video stream with a different view of the event. The video streams 105, 107, 109 may be provided to a computing device 120. Although only one computing device 120 is illustrated, the system 100 may include multiple computing device, and the video streams 105, 107, 109 may be provided to the multiple computing devices. Additionally, although three cameras 104, 106, 108 are illustrated in FIG. 1, the system 100 may include more than three cameras or fewer than three cameras.

The computing device 120 may act as a video queuing cluster to provide video from the cameras 104, 106, 108 to the user devices 160, 162, 164. For example, the computing device 120 may include a media parser 122 that parses each of the video streams 105, 107, 109 into multiple segments. Each segment may include multiple frames of video data. To illustrate, each segment may include a number of frames that together provide content (e.g. a video chuck) that has a particular playback time (e.g., 1 second, 5 seconds, or another playback time). The media parsers 122 may also associate identifying information, such as a segment identifier (ID) (e.g., a sequence number), a channel ID., a timestamp, etc., with each segment. The channel ID may indicate from which of the video stream 105, 107, 109 the video segment is derived.

The media parser 122 may store the video segments and corresponding identifying information at a database 126. Thus, the database 126 may include a plurality of segment records. An example of a representative segment record 128 is illustrated in FIG. 1. The representative segment record 128 includes a video segment and identifying information corresponding to the video segment, such as the segment ID, the timestamp, and the channel ID. In other examples, each segment record may include more information or less information than illustrated in FIG. 1. For example, video segments may be stored separately from identifying information, and the identifying information may include a pointer or key to access the video segment. As another example, the timestamp may be omitted.

The computing device 120 may also include a channel map 124 to map physical channels (e.g., the video streams 105, 107, 109) to logical channels. A logical channel may include media content associated with a particular video stream, such as the first video stream 105, or the logical channel may include media content associated with more than one video stream 105, 107, 109. For example, a logical channel may track a player or ball on a playing field at the venue 102, in which case video from different video streams 105, 107, 109 may be used to form the logical channel. The number of logical channels may be the same as the number of physical channels, greater than the number of physical channels, or less than the number of physical channels.

The computing device 120 may generate one or more logical channels using the video streams 105, 107, 109 and may make the logical channel or logical channels available to the user devices 160, 162, 164. For example, the computing device 120 may include a broadcast server 130. In FIG. 1, the broadcast server 130 is illustrated as a component (e.g., a processor at the computing device 120 that executes a set of software instructions) of the computing device 120; however, in other implementations, the broadcast server 130 may correspond to a hardware device that is distinct and separate from the computing device 120.

The broadcast server 130 may be configured to send media data of the logical channels via a broadcast transmission 134 to enable the user devices 160, 162, 164 to receive and playback the logical channels. For example, the broadcast server 130 may send a first set of segments 132 to a wireless communication system. Examples of the wireless communication system may include one or more computing devices, transmitters, receivers and/or support equipment of a third generation (3G) mobile communication network or a fourth generation (4G) mobile communication network, a fifth generation (5G) mobile communication network, a long term evolution (LTE) network, an LTE advanced (LTE-A) network, or another wide area wireless communication network. Other examples of the wireless communication system may include one or more computing devices, transmitters, receivers and/or support equipment of a local area network at the venue 102, such as a network compliant with an Institute of Electrical and Electronic Engineers (IEEE) wireless communication specification, such as an IEEE 802 specification. The wireless communication system may transmit the first set of segments 132 via the broadcast transmission 134. As used herein, "broadcast transmission" is used in a general sense to refer to any one-to-many type transmission. For example, a broadcast transmission may be directed to multiple user devices or may be addressed to a broadcast or multicast group that may include multiple user devices. Thus, in this context, the broadcast transmission 134 may include or correspond to a multicast transmission.

The wireless communication system may transmit (e.g., broadcast) each logical channel via a particular frequency or frequency band, a particular set of frequencies (e.g., in a frequency division multiplexed system), a particular set of transmission times (e.g., in a time division multiplexed system), or other logical arrangements. Thus, the first set of segments 132 may be accessible to each user device 160, 162, 164 (or each authorized user device) at the venue 102 via the broadcast transmission 134.

The broadcast server 130 may similarly generate and send a set of segments corresponding to each logical channel generated by the computing device 120. Thus, by use of one of the user devices 160, 162, 164, an audience member at the venue 102 may access multiple views of the event, where each view corresponds to a logical channel generated by the computing device 120.

In the example illustrated in FIG. 1, the computing device 120 also includes a replay server 140. In FIG. 1, the replay server 140 is illustrated as a component (e.g., a processor of the computing device 120 that executes a set of software instructions) of the computing device 120; however, in other implementations, the replay server 140 may correspond to a hardware device that is distinct and separate from the computing device 120.

The replay server 140 may be configured to provide on-demand replay media content to the user devices 160, 162, 164 (or to particular authorized user devices, as described further below). For example, the replay server 140 may receive a replay request 150 from a particular user device, such as a first user device 160, and send a second set of segments 142 based on the replay request 150. To illustrate, a user of the first user device 160 may provide user input via a user interface (such as one or more of the user interfaces of FIGS. 3-7) of a media access and playback application executed at the first user device 160 to generate the replay request 150. The replay request 150 may request media content (e.g., video data, audio data, or video and audio data) associated with a particular video stream 105, 107, 109 (or with a particular logical channel). For example, the replay request 150 may include information specifying that the second set of segments 142 is to be derived from the second video stream 107 for a particular time period (e.g., an offset time, such as 2 minutes ago). The replay request 150 may also specify a replay duration 152, or the replay duration 152 may be based on a default value. The replay duration may indicate a playback time (e.g., 1 minute) of media content associated with the replay media content.

The replay server 140 may generate the second set of segments 142 by accessing the database 126 and retrieving a subset of video segments that correspond to the requested media content based on the replay request. The replay server 140 may cause a communication session 144 to the first user device 160 to be initiated responsive to the replay request 150. The second set of segments 142 may be sent via the communication session 144 as a unicast transmission to the first user device 160. The communication session 144 may be automatically terminated after transmission of the second set of segments 142. For example, the replay server 140, the user device 160, or both, may automatically terminate the communication session 144 after the requested media content has been sent via the communication session 144. To illustrate, if the replay duration 152 indicated two minutes, the second set of segments 142 may be selected from a plurality of segments in the database 126 to provide replay content having a duration of two minutes. Accordingly, in this example, if each segment includes media data sufficient to provide ten seconds of playback time, the second set of segments 142 may include twelve segments (2 minutes=120 seconds, and 120 seconds divided by 10 seconds per segment=12 segments) and the communication session 144 may be terminated after the twelve segments have been sent.

As another example, the replay server 140, the user device 160, or both, may automatically terminate the communication session 144 based on the replay duration. To illustrate, when the replay duration 152 associated with the replay request 150 indicates that three minutes of replay media content (e.g., a particular set of segments that have a total playback time of three minutes) is requested, the replay server 140, the user device 160, or both, may terminate the communication session 144 when a timer indicates that three minutes have passed since transmission of the second set of segments 142 started or since playback of media content from the second set of segments 142 started. While sending the second set of segments 142, the computing device 120 may send a third set of segments 148 to another device 146 based on another replay request (not shown), may continue to send the first set of segments 132, or both.

In FIG. 1, the system 100 also includes a transaction server 170. Although FIG. 1 illustrates the transaction server 170 as separate from the computing device 120, in other implementations, the transaction server 170 may be part of the computing device 120 (e.g., may include or correspond to software executed at the computing device 120). The transaction server 170 may provide information to the computing device 120 to indicate which user devices (e.g., the user devices 160, 162, 164) are authorized to access the media content associated with the event, which media content a particular device is authorized to access, or both. The transaction server 170 may have access to account records 172 that include information such as subscription status, subscription level, pay-per-view purchase, etc., associated with each user device. Thus, the transaction server 170 may enable access to media content associated with the event via the computing device 120 based on one or more access models. Examples of access models include, but are not limited to, a subscription model, a pay-per-view model, a time-based model, a volume-based model, or a content-based model.

In this context, a subscription model refers to an access model in which a user subscribes to a service (e.g., a subscription service) to receive authorization to access media content. For example, in a subscription model, the user may pay a regular (e.g., monthly) recurring fee for access to a media service that provides replay media, multiple viewing angle media, or both. As another example, a mobile data provider, such as a mobile communication service provider, may provide the replay media, the multiple viewing angle media, or both, as part of a mobile data subscription. In a particular implementation, different levels of subscription services may be available. For example, a first subscription level may correspond to a live stream subscription service, which may allow a user to access live event content (e.g., the first set of segments 132). In this example, a second subscription level may correspond to a replay subscription service, which may allow a user to access replay media content (e.g., the second set of segments 142). Further, a third subscription level may correspond to a live and replay subscription service, which may allow a user to access live event content (e.g., the first set of segments 132) and to replay media content (e.g., the second set of segments 142).

In this context, a pay-per-view model refers to an access model in which a user pays for access to media associated with a particular event or a particular set of events (e.g., a set of competitions associated with particular Olympic games). As another example of a pay-per-view model, access to media associated with the event (or set of events) may be included in a purchase of access to the live event (e.g., included in a ticket price). Depending on the specific implementation, the media that the user is able to access may be limited to broadcast (e.g., live video) content or replay content or may include both broadcast and replay content. In a particular implementation, different levels of pay-per-view services may be available. For example, a first pay-per-view level may correspond to a live stream pay-per-view service, which may allow a user to access live event content (e.g., the first set of segments 132). In this example, a second pay-per-view level may correspond to a replay pay-per-view service, which may allow a user to access replay media content (e.g., the second set of segments 142). Further, a third pay-per-view level may correspond to a live and replay pay-per-view service, which may allow a user to access live event content (e.g., the first set of segments 132) and to replay media content (e.g., the second set of segments 142).

A "time-based model" refers to an access model in which a user pays for access to a particular time-specified portion of media content. To illustrate, the user may pay for twenty minutes of replays, which may be limited to a single event or may be used across multiple events (such as 20 minutes of replays from any of a set of events, or 20 minutes of replays from a particular event). Depending on the specific implementation, the media content may be limited to broadcast (e.g., live video) content or replay content or may include both broadcast and replay content.

A "volume-based model" refers to an access model in which a user pays for access to a particular volume-specified portion of media content. To illustrate, the user may pay for access to five gigabytes of media data. Depending on the specific implementation, the media data may be limited to media content associated with a single event or may be used across multiple events. Similarly, depending on the specific implementation, the media data may be limited to broadcast (e.g., live video) content or replay content or may include both broadcast and replay content.

A "content-based model: refers to an access model in which a user pays for access to a particular content-specified portion of media content. To illustrate, the user may pay for access to a particular distinguishable subset of an event, such as a third quarter of a football game. Depending on the specific implementation, the media content may be limited to broadcast (e.g., live video) content or replay content or may include both broadcast and replay content.

Other access models or combinations of access models may also be used. For example, volume- and time-based models may be combined such that the user is provided access to a particular volume-specified portion of the media content within a specific time. In this example, two limits (i.e., a time limit and a volume limit) for the access are specified. More limitations or different limitations may also be combined.

Thus, the system 100 enables members of the audience of an event to access media content associated with the event. The media content may include "live" content, such as the first set of segments 132, which may be broadcast with little delay. The media content may also or in the alternative include replay content, such as the second set of segments 142.

Figure 2:
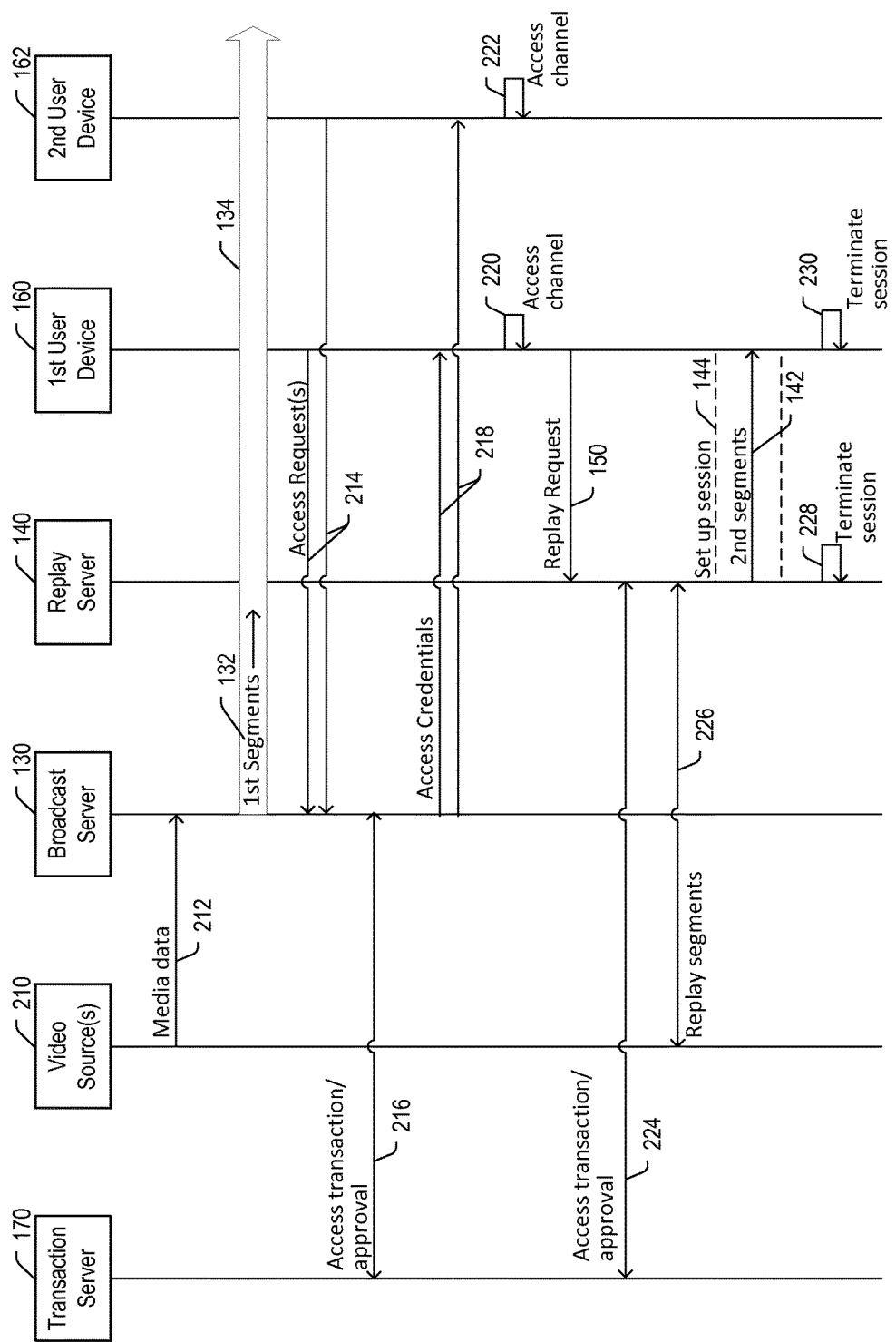
FIG. 2 is a diagram illustrating a particular example of communications within the system of FIG. 1.

FIG. 2 is a diagram illustrating a particular example of communications within the system of FIG. 1. In particular, FIG. 2 illustrates the transaction server 170, the broadcast server 130, the replay server 140, the first user device 160, and the second user device 162 of FIG. 1. FIG. 2 also shows a video source 210 or video sources. The video source 210 of FIG. 2 is a source of media content (e.g., video segments or video streams), such as one or more of the cameras 104, 106, 108 of FIG. 1, the database 126 of FIG. 1, or a combination thereof. At 212, the video source 210 provides media content (such as one or more video segments or video streams) to the broadcast server 130. The broadcast server 130 causes one or more video segments derived from the media data to be sent via the broadcast transmissions 134 as the first set of segments 132.

In the example illustrated in FIG. 2, the first user device 160 and the second user device 162 send access requests, at 214, to the broadcast server 130. In this example, the access requests may request access credentials or other information to enable the user devices 160, 162 to access, decode, decrypt, or playback the first set of segments 132. To illustrate, the first user device 160 may execute a media access and playback application that, when authorized, generates a display at the first user device 160 to enable the user to playback and consume (e.g., view) media content of the first segments. The media access and playback application may cause the first user device 160 to send an access request to the broadcast server 130 at startup or in response to input from the user. In some implementations, one or both of the user devices 160, 162 may already have access credentials stored in a memory, e.g., as a result of prior configuration or set up. In this implementation, a user device 160, 162 that already has appropriate access credentials may not send an access request. In other implementations, the access requests may be sent to another device rather than to the broadcast server 130. For example, the access requests may be sent to the transaction server 170. Each access request may include information to identify the user device 160, 162 that sent the access request, to identify a user or user account, other information, or a combination thereof.

In the example illustrated in FIG. 2, at 216, the broadcast server 130 sends an access transaction to the transaction server 170, and the transaction server 170 sends a transaction approval to the broadcast server 130. For example, the access transaction may include one more messages that identify a user or a user device that is requesting access to the media content sent via the broadcast transmission 134. The transaction server 170 may access account records (e.g., the account records 172 of FIG. 1) or other information to determine whether the user or user device is to be provided access. In another example, the access transaction may include payment authorization information, redemption information (e.g., a coupon code or ticket number) or other information provided by the user to purchase or redeem access to the media content. In this example, the transaction server 170 confirms the payment or redemption. To illustrate, the transaction server 170 may cause a charge to be made to a user account or credit card based on the payment information. As another illustrative example, the transaction server 170 may verify that the redemption information is valid.

The access approval may indicate that the user or user device is to be provided access to the media content sent via the broadcast transmissions 134, is to be provided access to other media content (such as replay content), or both. The access approval may include or correspond to one more messages that identify the user or user device and indicate that the user or user device is to be provided access to the media content. In some implementations, the access approval may also include access credentials, such as an encryption key, to be provided to the user device to enable access to the media content. Although only an access approval is shown in FIG. 2, in some cases, the transaction server 170 may not approve access to the media content by a particular device, in which case, the transaction server 170 may send an access denial message.

After the transaction server 170 approves access to the media content by each of the user devices 160, 162, the broadcast server 130 (or another device) may cause access credentials to be send to the user devices 160, 162, at 214. The access credentials may include an encryption key that enables the media access and playback application to decrypt the media content. In another example, the media content may not be encrypted. To illustrate, the media access and playback application may be configured to not generate a display of the media content at a particular user device until access credentials, such as a token, have been received.

At 220 and 222, after the access credentials are received, each user device 160,162 may access media content via particular channel. As used herein, a channel may include a range of transmission frequencies of the broadcast transmissions 134, or may include a "logical" channel. A logical channel may be associated with a particular frequency or frequency band, a particular set of frequencies (e.g., in a frequency division multiplexed system), a particular set of transmission times (e.g., in a time division multiplexed system), or other logical arrangements.

While a particular user device is receiving the media content, the particular user device may generate a display of the media content for consumption (e.g., viewing) by the user. FIGS. 3-7 illustrate examples of user interfaces that may be displayed before, during, or after the particular user device receives the media content. In the example of FIG. 2, while watching the event, the user of the first user device 160 indicates a desire to view replay media content. For example, the user may indicate the desire to view the replay media content using one or more of the user interfaces of FIGS. 3-7. In response, the first user device 160 sends the replay request 150. In the example illustrated in FIG. 2, the replay request 150 is sent to the replay server 140; however, in other implementations, the replay request 150 may be sent to another device of the system of FIG. 1, such as the transaction server 170.

The replay request 150 may be processed in a manner similar to the manner in which the access requests are processed, as explained above. For example, at 224, the replay server 140 may send an access transaction to the transaction server 170, and the transaction server 170 may send an access approval to the replay server 140. The various alternative examples and implementations described above with respect to the access requests may also apply to the replay request 150.

In some implementations, the access credentials provided to the first user device 160 at 218 may also provide access to replay media content, in which case the access transaction and access approval may be omitted. Alternately, additional access credentials (not shown) may be provided to the first user device 160 to enable the first user device to access the replay media content.

After access to the replay media content by the first user device 160 is approved, the replay server 140 may, at 226, retrieve, from the video source 210, replay segments corresponding to the requested replay media content. The replay segments may be retrieved based on the replay request 150. For example, the replay request 150 may indicate a particular video stream or logical channel from which the replay media content is to be derived. To illustrate, the system 100 of FIG. 1 illustrated three different video streams 105, 107, 109, and the replay request 150 may indicate that the replay media content should come from the first video stream 105. As another illustrative example, the replay request 150 may indicate that the replay media content is to be derived from a logical channel that includes media content from more than one of the video streams 105, 107, 109, such as a logical channel assembled from multiple cameras to follow a particular player.

The replay request 150 may also indicate an offset time. The offset time may indicate a time offset from when the replay request 150 is sent (or received) to a beginning of the replay media content, e.g., how far into the past the replay media content should start. For example, each video segment may be associated with a timestamp, as shown in FIG. 1. In this example, the offset time may be subtracted from a timestamp of the replay request 150 to determine a time of a beginning of the replay media content. The time of the beginning of the replay media content may be compared to timestamps in the database 126 to select an initial video segment of the replay media content. In another implementation, the offset time may be a default value. For example, depending on the event (e.g., whether the event is fast paced or slow paced) an offset time of a few seconds to a few minutes may be used as a default value. In this example, the default value may be used for all replay requests (e.g., no replay request may specify a different offset time) or the default value may be used when a particular replay request fails to specify a different offset time.

The replay request 150 may also indicate a replay duration. The replay duration may indicate how much (in a time increment) media content should be replayed. For example, the offset time may be used to select a first video segment of the replay media content, and the replay duration may be used to determine how many video segment to include in the replay media content. To illustrate, as explained above, the offset time may be subtracted from a timestamp of the replay request 150 to determine the time of the beginning of the replay media content. The replay duration may be added to the time of the beginning of the replay media content to determine an end time of the replay media content. The end time of the replay media content may be compared to timestamps in the database 126 to select a last video segment of the replay media content. In another implementation, the replay duration may be a default value. For example, the replay duration may be a few seconds or a few minutes. In this implementation, the default value of the replay duration may be used for all replay requests (e.g., no replay request may specify a different replay duration) or the default value may be used when a particular replay request fails to specify a different replay duration. In another example, the replay duration may be limited to or may have a default value corresponding to the offset time. For example, the default value of the replay duration may correspond to a difference between the time of the beginning of the replay media content and a time of the timestamp of the replay request.

The replay server 140 may retrieve the replay segments such that the replay segments include an initial video segment (of a particular channel) selected based on the offset time, an final video segment (of the particular channel) based on the replay duration, and each video segment of the particular channel that is sequentially between the initial video segment and the final segment. The replay server 140 may also cause a communication session 144 to be established between the replay server 140 and the first user device 160. In some implementations, the communication session 144 may include or correspond to a secure communication tunnel, such as a virtual private network tunnel. In other implementations, the communication session 144 may include or correspond to another dedicated (e.g., one-to-one) communication downlink between the replay server 140 and the first user device 160. In a particular implementation, the communication session 144 uses wireless unicast transmissions to convey data to the first user device 160.

After establishing the communication session 144, the replay segments may be sent via the communication session 144 to the first user device 160 as the second set of segments 142. The first user device 160 may receive the second set of segments 142 and generate a user interface display to present replay media content of the second set of segments 142 to the user.

The replay server 140 (at 228), the first user device 160 (at 230), or both, may automatically terminate the communication session 144. For example, the replay server 140 may automatically terminate communication session 144 upon determining that all of the second set of segments 142 (e.g., all of the requested replay media content) have been sent. As another example, the replay server 140 may automatically terminate the communication session 144 upon expiration of a timer. To illustrate, the replay server 140 may set the timer to a value based on the replay duration associated with the replay request 150, and when the timer expires, the replay server 140 may terminate the communication session. As another example, the first user device 160 may automatically terminate communication session 144 upon determining that all of the second set of segments 142 (e.g., all of the requested replay media content) have been received. As another example, the first user device 160 may automatically terminate the communication session 144 upon expiration of a timer. To illustrate, the first user device 160 may set the timer to a value based on the replay duration associated with the replay request 150, and when the timer expires, the first user device 160 may terminate the communication session. Terminating the communication session 144 may include exchanging one or more messages. For example, the replay server 140 may send a teardown message or a termination notification to the first user device 160 to initiate or complete termination of the communication session 144. Alternately, the first user device 160 may send the teardown message or a termination notification to the replay server 140. Terminating the communication session 144 enables recovery and reuse of bandwidth used for unicast transmissions to enable the communication session 144.

Figure 3:
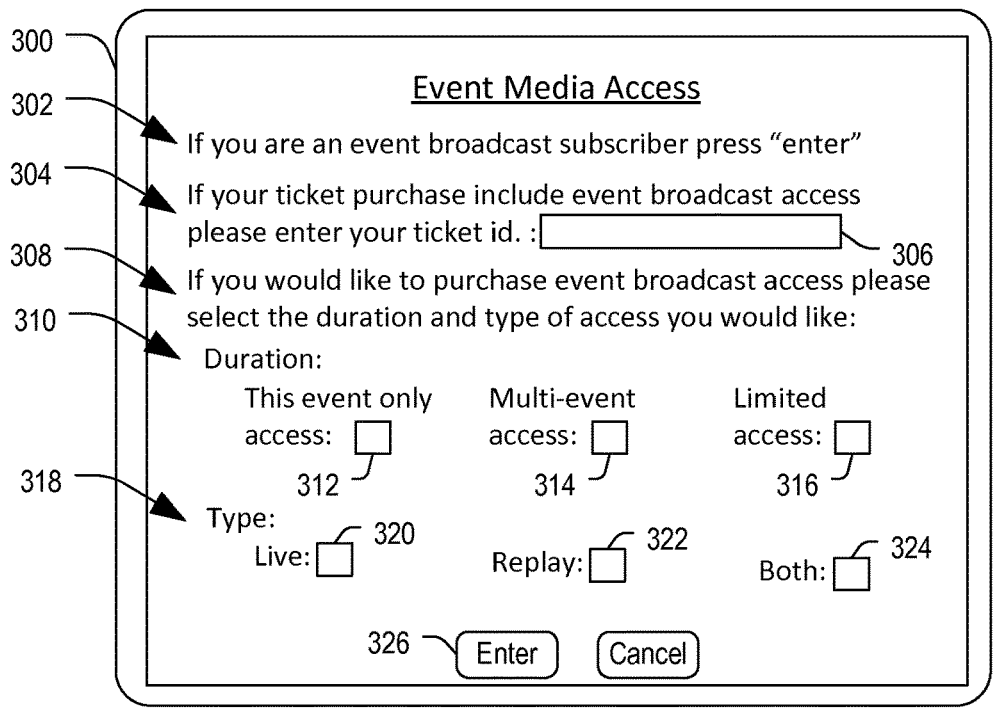
FIG. 3 is a diagram illustrating a particular example of a first user interface of a user device of the system of FIG. 1.

FIG. 3 is a diagram illustrating a particular example of a first user interface 300 of a user device of the system 100 of FIG. 1. The first user interface 300 may be used to prompt a user to provide information to generate an access request, such as one of the access requests at 214 of FIG. 2. The first user interface 300 may be displayed when a user device executes a media access and playback application or in response to a user selection of another user interface associated with the media access and playback application. The first user interface 300 illustrates particular prompts and selectable options that may be displayed; however, in other implementations, more prompts, fewer prompts or different prompts may be used. Further, in other implementations, more selectable options, fewer selectable options, or different selectable options may be used.

In the example illustrated in FIG. 3, the first user interface 300 includes a first prompt 302 indicating that if the user is a subscriber to a particular service that provides access to media content associated with the event (e.g., an event broadcast service subscriber), the user can select an "enter" option 326. Responsive to the user selecting the enter option 326, the user device may send an access request, such as one of the access requests at 214 of FIG. 2. In a particular implementation, if the user selects the enter option without providing input at any other selectable option of the first user interface 300, the access request only includes information stored at a memory of the user device, such as a device identifier, a subscriber identifier, or access credentials. In another implementation, the user device may have access credentials (such as a decryption key) stored at a memory that are sufficient to enable access to the media content. In this implementations, selecting the enter option 326 may cause the user device to access the media content, such as the first set of segments 132 of FIG. 1 without sending an access request.

In the example illustrated in FIG. 3, the first user interface 300 includes a second prompt 304 indicating that if the user previously purchased access to the media content associated with the event (such as when a ticket to the event was purchased), the user may provide information associated with the prior purchase via selectable option 306. In the specific example illustrated in FIG. 3, the prior purchase is associated with a ticket purchase, but in other implementations, the prior purchase may be not be associated the ticket purchase. For example, the user may purchase access to media content associated with an event at an entrance to the event and be provided a redeemable code that may be entered at the selectable option 306. Information provided at the selectable option 306 may be sent with the access request to confirm that the user is authorized to access the media content associated with the event. Alternatively, the media access and playback device may process the information provided at the selectable option 306 to confirm that the user is authorized to access the media content. Additionally, although the selectable option 306 is illustrated as a text field in FIG. 3, in other implementations, the selectable option 306 may include or correspond to a different data entry mechanism. To illustrate, the selectable option 306 may be a soft button that, upon selection, causes a camera of the user device to be activated to enable the user device to read a computer readable data, such as text, a linear bar code or a two-dimensional barcode associated with or identifying the prior purchase.

In the example illustrated in FIG. 3, the first user interface 300 includes a third prompt 308 indicating that the user can execute a transaction to enable access to the media content associated with the event. The first user interface 300 also includes a first set of selectable options 310 associated with a duration of media access to be purchased via the transaction, and a second set of selectable options 318 associated with a type of media access to be purchased.

The first set of selectable options 310 may include, for example, a single event access option 312, a multi-event access option 314, a limited access option 316, other options, or a combination thereof. The limited access option 316 may allow the user to specify a time limit, a volume limit, or a content limit, as described with reference to FIG. 1. The second set of selectable options 318 may include, for example, a live access option 320, a replay access option 322, a both live and replay access option 324, other options, or a combination thereof.

Although, FIG. 3 illustrates various selectable options in a single user interface, in other implementations, similar information may be gathered using other interface configurations. For example, the user may be lead through a series of menus. As another example, the user device may generate a voice call, and the information may be provided via the voice call. Additionally, although the selectable options in FIG. 3 are illustrated as text boxes, check boxes and soft buttons, some or all of the selectable options may use a different input mechanism than illustrated in FIG. 3. Further, default values or values based on user settings stored at the user device may be used rather than or in addition to information provided via the selectable options of FIG. 3.

Information provided via the first user interface 300 may be processed by the user device, sent to a remote device, such as the broadcast server 130, the replay server 140, or the transaction server 170 of FIG. 1. The user device may be authorized to access the media content associated with the event based on the information provided via the first user interface 300.

Figure 4:
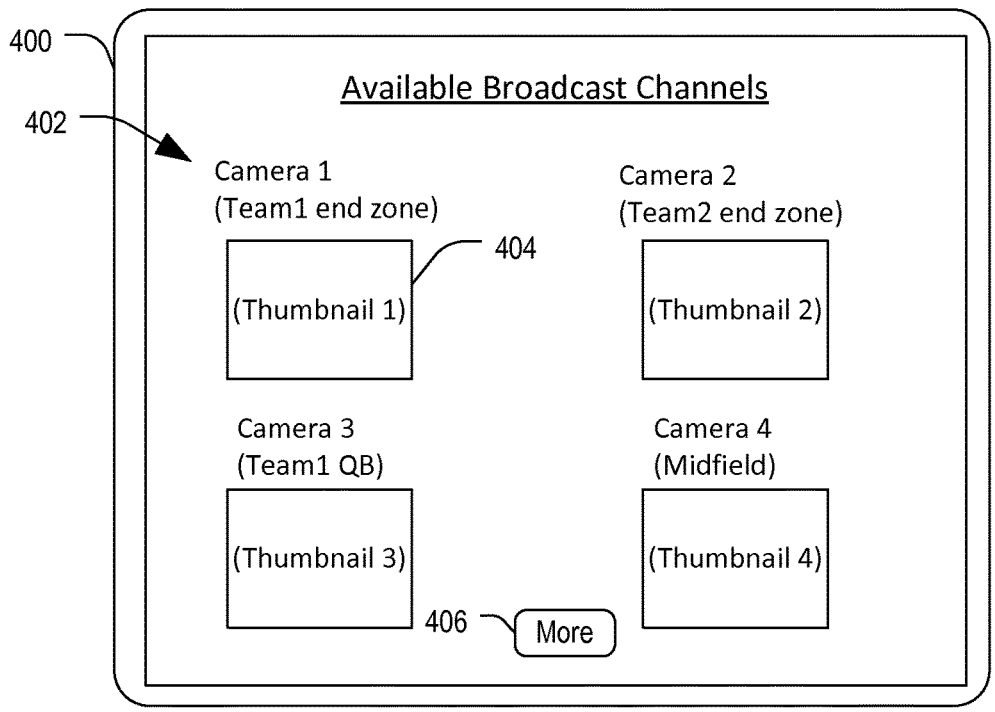
FIG. 4 is a diagram illustrating a particular example of a second user interface of the user device of the system of FIG. 1.

FIG. 4 is a diagram illustrating a particular example of a second user interface 400 of the user device of the system of FIG. 1. The second user interface 400 may be used to allow the user to select particular media content for viewing. For example, the second user interface 400 may be displayed after the user device is authorized to access the media content associated with the event or when a user indicates (e.g., via user input) as desire to via different content than the user is viewing at a particular time. The second user interface 400 illustrates particular prompts and selectable options that may be displayed; however, in other implementations, more prompts, fewer prompts or different prompts may be used. Further, in other implementations, more selectable options, fewer selectable options, or different selectable options may be used.

In the particular example illustrated in FIG. 4, the second user interface 400 includes a listing 402 of available broadcast channels. The listing 402 of available broadcast channels may include only channels that the user is authorized to access or may include both channels that the user is authorized to access and other channels that the user could purchase access to. In the example illustrated in FIG. 4, each channel is associated with identifying text and a thumbnail image or video, such as thumbnail 404. As described above, each channel may correspond to a single media stream, such as one of the video streams 105, 107, 109 of FIG. 1, or may correspond to a logical channel that includes media from multiple media streams. To illustrate, a first channel may include a video stream from a single camera (e.g., camera 1 in FIG. 4), and another channel may include video data from multiple cameras to follow a particular player (e.g., Team 1 quarterback (QB) in FIG. 4). If more channels are available than can be displayed in a single display, the second user interface 400 may include a selectable option 406 to see additional listings of available channels.

Figure 5:
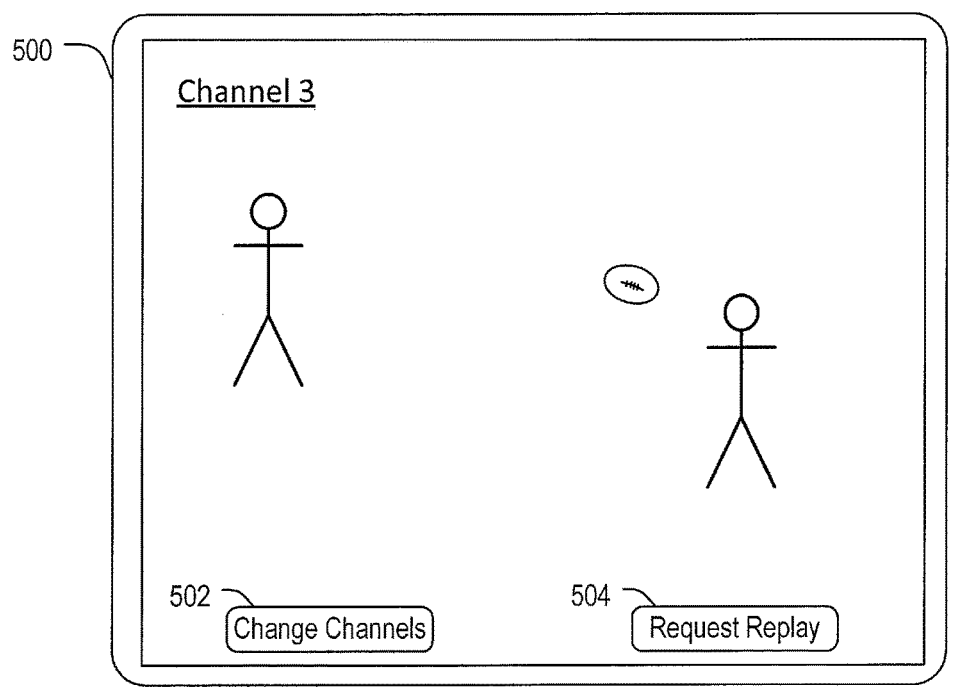
FIG. 5 is a diagram illustrating a particular example of a third user interface of the user device of the system of FIG. 1.

A user may select a particular channel by, for example, using an input device (such as a touchscreen or pointing device) or selecting a thumbnail corresponding to the particular channel. In response to selection of a particular channel, the user device may "tune" to the selected channel. As described above, the channel may not correspond to a particular frequency range, thus "tuning" in this context includes performing such actions as are needed to access media content (e.g., video segments) corresponding the particular channel from a broadcast transmission. The user device may process the media content and generate a display of the media content. FIG. 5 illustrates an example of a user interface that may display the media content.

Although, FIG. 4 illustrates various selectable options in a single user interface, in other implementations, similar information may be gathered using other interface configurations. For example, a series of menus may be used.

FIG. 5 is a diagram illustrating a particular example of a third user interface 500 of the user device of the system of FIG. 1. The third user interface 500 may be used to display media content associated with an event. The third user interface 500 illustrates particular prompts and selectable options that may be displayed; however, in other implementations, more prompts, fewer prompts or different prompts may be used. Further, in other implementations, more selectable options, fewer selectable options, or different selectable options may be used.

In the example of FIG. 5, the third user interface 500 is displaying live media content (e.g. the first set of segments 132 of FIG. 1) corresponds to "channel 3" of the event. FIG. 5 also shows a selectable option 502 to enable the user to change channels. For example, selection of the selectable option 502 may cause the second user interface 400 of FIG. 4 to be displayed. FIG. 5 also shows a selectable option 504 to request replay media content. Selection of the selectable option 504 may cause a replay request, such as the replay request 150 of FIG. 1 to be sent. Alternately, selection of the selectable option 504 may cause the user device to display a user interface to gather information regarding the replay request. For example, selection of the selectable option 504 may cause the fourth user interface 600 of FIG. 6 to be displayed.

Although, FIG. 5 illustrates various selectable options in a single user interface, in other implementations, similar information may be gathered using other interface configurations. For example, a series of menus may be used.

Figure 6:
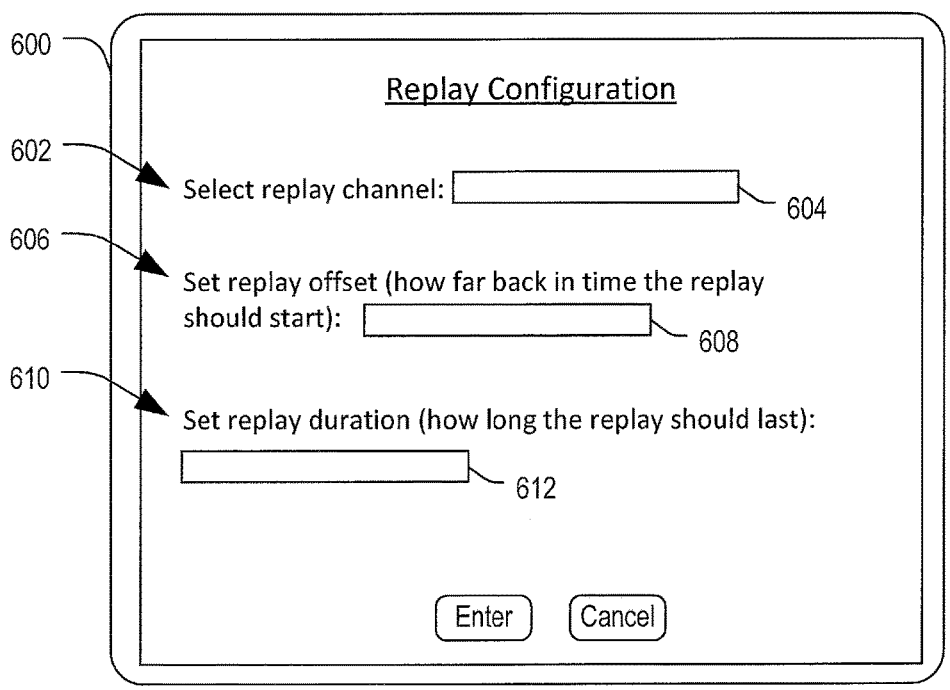
FIG. 6 is a diagram illustrating a particular example of a fourth user interface of the user device of the system of FIG. 1.

FIG. 6 is a diagram illustrating a particular example of a fourth user interface 600 of the user device of the system of FIG. 1. The fourth user interface 600 may be used to prompt a user to provide information to generate a replay request or to configure default values for a replay request, such as the replay request 150 of FIG. 1. The fourth user interface 600 illustrates particular prompts and selectable options that may be displayed; however, in other implementations, more prompts, fewer prompts or different prompts may be used. Further, in other implementations, more selectable options, fewer selectable options, or different selectable options may be used.

In the example of FIG. 6, the fourth user interface 600 includes a first prompt 602 indicating that the user can select a particular channel from which the replay media is to be derived. The first prompt 602 is associated with a selectable option 604 to enable the user to select the replay channel. A channel designated by the user via the selectable option 604 may be saved as a default value at a memory of the user device and/or may be indicated in a data field of a replay request.

In the example of FIG. 6, the fourth user interface 600 also includes a second prompt 606 indicating that the user can set a replay offset value. The replay offset value indicates how far back in time the replay should start. The second prompt 606 is associated with a selectable option 608 to enable the user to designate the offset value. A offset value indicated by the user via the selectable option 608 may be saved as a default value at a memory of the user device and/or may be indicated in a data field of a replay request.

In the example of FIG. 6, the fourth user interface 600 also includes a third prompt 610 indicating that the user can set a replay duration. The replay duration indicates how long a replay should last. The third prompt 610 is associated with a selectable option 612 to enable the user to designate the replay duration. A replay duration indicated by the user via the selectable option 612 may be saved as a default value at a memory of the user device and/or may be indicated in a data field of a replay request.

Thus, the fourth user interface 600 enables the user to either configure a particular replay request, to save default values for later user, or both. For example, at a beginning of the event, the user may preconfigure default values using the fourth user interface 600 so that generating a replay request during the game can occur more quickly and may therefore be less distracting from the event.

Although, FIG. 6 illustrates various selectable options in a single user interface, in other implementations, similar information may be gathered using other interface configurations. For example, a series of menus may be used.

Figure 7:
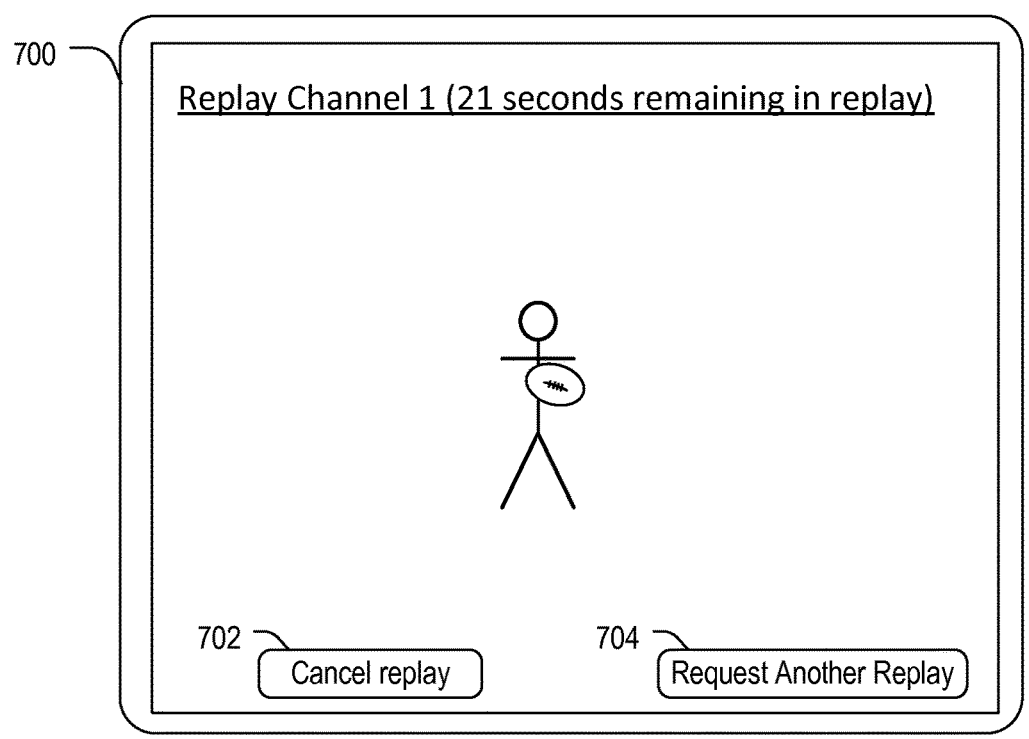
FIG. 7 is a diagram illustrating a particular example of a fifth user interface of the user device of the system of FIG. 1.

FIG. 7 is a diagram illustrating a particular example of a fifth user interface 700 of the user device of the system of FIG. 1. The fifth user interface 700 may be used to display replay media content associated with an event. The fifth user interface 700 illustrates particular prompts and selectable options that may be displayed; however, in other implementations, more prompts, fewer prompts or different prompts may be used. Further, in other implementations, more selectable options, fewer selectable options, or different selectable options may be used.

In the example of FIG. 7, the fifth user interface 700 is displaying replay media content (e.g. the second set of segments 142 of FIG. 1) corresponding to "channel 1" of the event. The fifth user interface 700 may also provide other information about the replay, such as the replay duration, the replay offset time, or a time remaining for the replay. FIG. 7 also shows a selectable option 702 to enable the user to cancel the replay. For example, selection of the selectable option 702 may cause the second user interface 400 of FIG. 4 of the third user interface 500 of FIG. 5 to be displayed. Additionally, the user device may terminate a communication session used to receive video segments of the replay media in response to selection of the selectable option 702.

FIG. 7 also shows a selectable option 704 to request additional replay media content (e.g., another replay). Selection of the selectable option 704 may cause another replay request to be sent. Alternately, selection of the selectable option 704 may cause the user device to display a user interface to gather information regarding the additional replay request. For example, selection of the selectable option 704 may cause the fourth user interface 600 of FIG. 6 to be displayed.

Although, FIG. 7 illustrates various selectable options in a single user interface, in other implementations, similar information may be gathered using other interface configurations. For example, a series of menus may be used.

Figure 8:
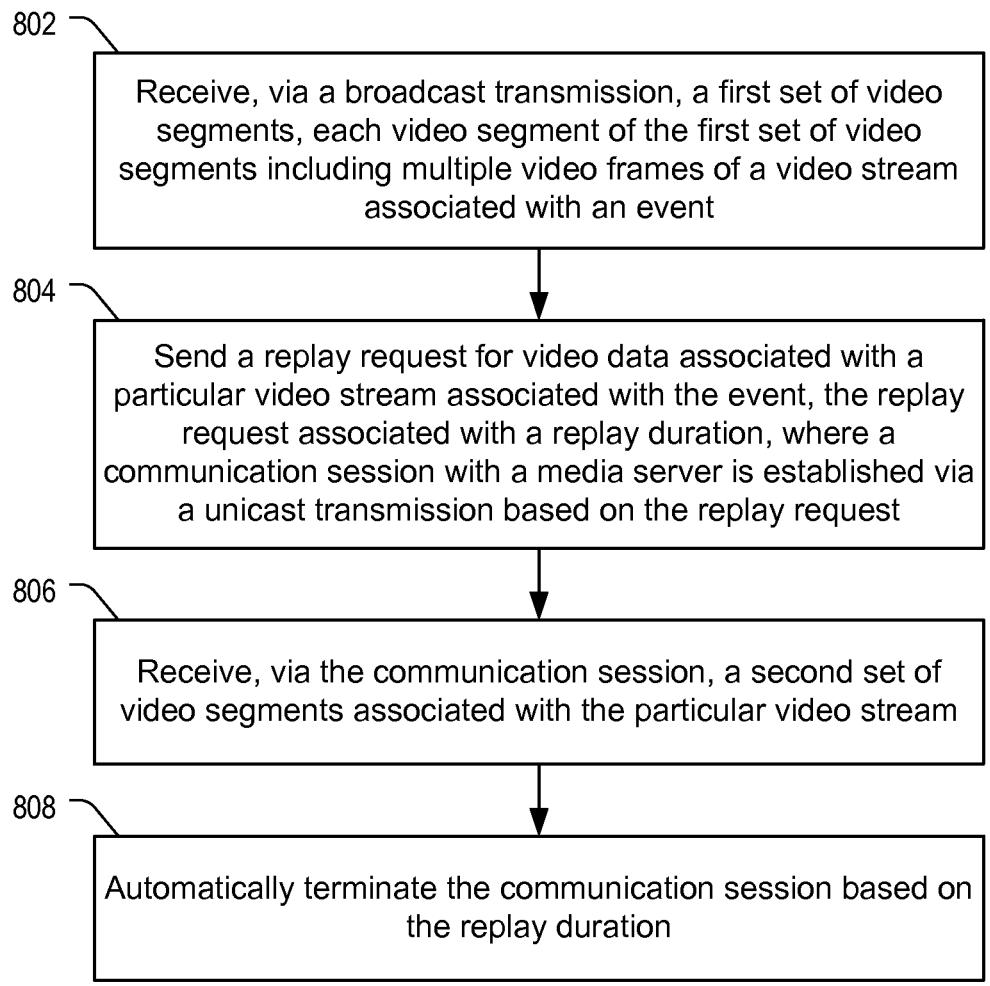
FIG. 8 is a flowchart of a particular example of a method of accessing media content associated with an event.

FIG. 8 is a flowchart of a particular example of a method of accessing media associated with an event. The method 800 may be performed by a user device of the system 100 of FIG. 1, such as the first user device 160.

The method 800 may include, at 802, receiving, via a broadcast transmission, a first set of video segments, where each video segment of the first set of video segments includes multiple video frames of a video stream associated with an event. For example, the user device 160 of FIG. 1 may receive the first set of segments 132 via the broadcast transmissions 134.

The method 800 may include, at 804, sending a replay request for video data associated with a particular video stream associated with the event. The replay request may be associated with a replay duration. The replay duration may be a user provided value or a default value. In a particular implementation, the method 800 may include generating a user interface display that includes a first option to specify the replay duration and a second option to specify that replay media content (e.g., a second set of video segments) be derived from a particular video stream of a plurality of video streams associated with the event. In this implementation, for example, the replay request may include a data element that indicates the replay duration. The replay duration may indicate a playback time of replay media content (e.g., the second set of video segments). For example, the user device 160 of FIG. 1 may send the replay request 150 to the replay server 140. The replay request 150 may include the replay duration 152.

A communication session with a media server may be established via a unicast transmission based on the replay request. The user device 160 or the replay server 140 may initiate set up of the communication session 144 based on the replay request 150.

The method 800 may include, at 806, receiving, via the communication session, replay media content (e.g., the second set of video segments) associated with the particular video stream. For example, the user device 160 of FIG. 1 may receive the second set of segments 142 via the communication session 144. The user device 160 may generate a display or user interface to present the replay media content to the user. For example, the user device 160 may generate the fifth user interface 700 to present the replay media content for consumption (e.g., viewing).

The method 800 may include, at 808, automatically terminating the communication session based on the replay duration. For example, the user device 160, the replay server 140, or both, may automatically terminate the communication session 144 based on the replay duration.

Figure 9:
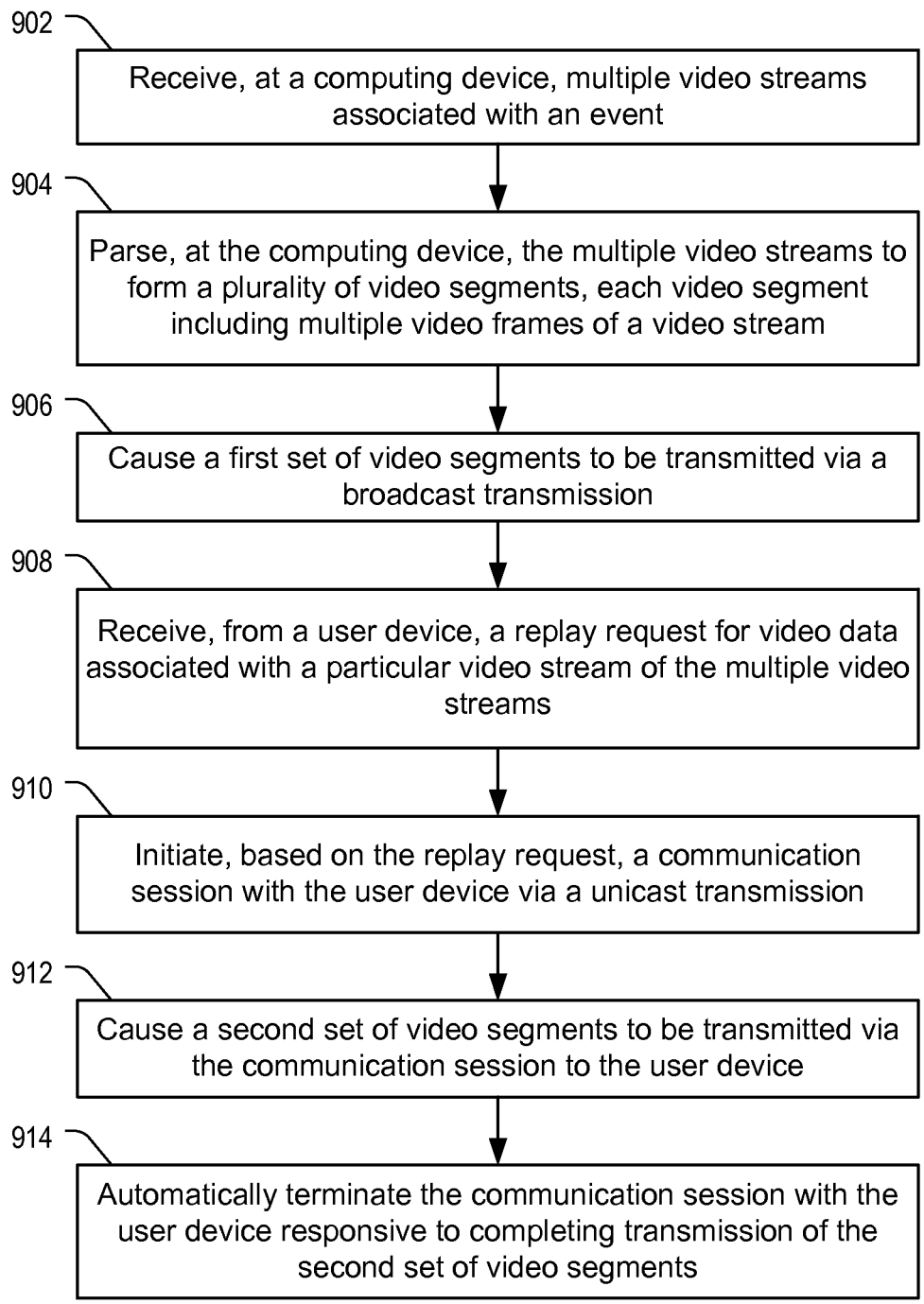
FIG. 9 is a flowchart of a particular example of a method of distributing media content associated with an event.

FIG. 9 is a flowchart of a particular example of a method 900 of distributing media content associated with an event. The method 900 may be performed by a device of the system 100 of FIG. 1, such as the computing device 120.

The method 900 may include, at 902, receiving multiple video streams associated with an event. For example, the multiple video streams may include or correspond to the video streams 105, 107 or 109 of FIG. 1.

The method 900 may also include, at 904, parsing the multiple video streams to form a plurality of video segments, where each video segment includes multiple video frames of a video stream. For example, the media parser 122 of FIG. 1 may parse the multiple video streams to form the video segments. The video segments, or a subset of the video segments, may be stored at the database 126, along with other data, such as the segment ID, the timestamp, the channel ID, or other data.

The method 900 includes, at 906, transmitting a first set of video segments via a broadcast transmission. For example, the broadcast server 130 of FIG. 1 may send the first set of segments 132 via the broadcast transmission 134.

The method 900 includes, at 908, receiving, from a user device, a replay request for video data associated with a particular video stream of the multiple video streams. For example, the replay server 140 of FIG. 1 may receive the replay request 150 from the first user device 160.

The method 900 includes, at 910, initiating, based on the replay request, a communication session with the user device via a unicast transmission. For example, the replay server 140 of FIG. 1 may initiate the communication session 144 with the first user device 160 based on the replay request 150.

The method 900 includes, at 912, transmitting a second set of video segments via the communication session to the user device. For example, the replay server 140 of FIG. 1 may transmit the second set of segments 142 to the first user device 160 via the communication session 144.

In particular implementation, the second set of video segments may be selected based on the replay request. For example, a number of video segments in the second set of video segments may be determined to satisfy a replay duration associated with the replay request. The replay duration is indicated by the replay request or may be a default value.

In a particular implementation, a timestamp is associated with the replay request and the second set of video segments is selected based on the timestamp and based on segment identification information associated with a particular video. The segment identification information may include, for example, an offset time, and the second set of video segments may include video segments corresponding to a time that precedes the timestamp by the offset time. The offset time may be indicated by the replay request or may be a default value.

The method 900 includes, at 914, automatically terminating the communication session with the user device responsive to completing transmission of the second set of video segments. For example, the replay server 140 of FIG. 1 may terminate the communication session 144 after completing transmission of the second set of segments 142. Thus, the method 900 enables providing users access to media content associated with an event.

In conjunction with structure, devices and methods described herein, methods and systems are provided that enable distribution of media content associated with an event, such as a sporting event. In particular, the methods and systems may enable audience members at a venue (such as stadium) to view the event from various angles by, for example, accessing media content associated with different cameras. Further, the methods and systems may enable the audience members at the venue to access replay media content associated with event. For example, the replay media content may be indexed and stored at a database, such as the database 126 of FIG. 1. The replay media content may be available on-demand to the audience members. A service provider (such as an owner or operator of the venue, a mobile data provider, a media service provider, or a combination thereof) may generate revenue by offering access to the media content according to various service models, such as a subscription service model, a pay-per-view service model, a time-based model, a volume-based model, or a content-based model.

Figure 10:
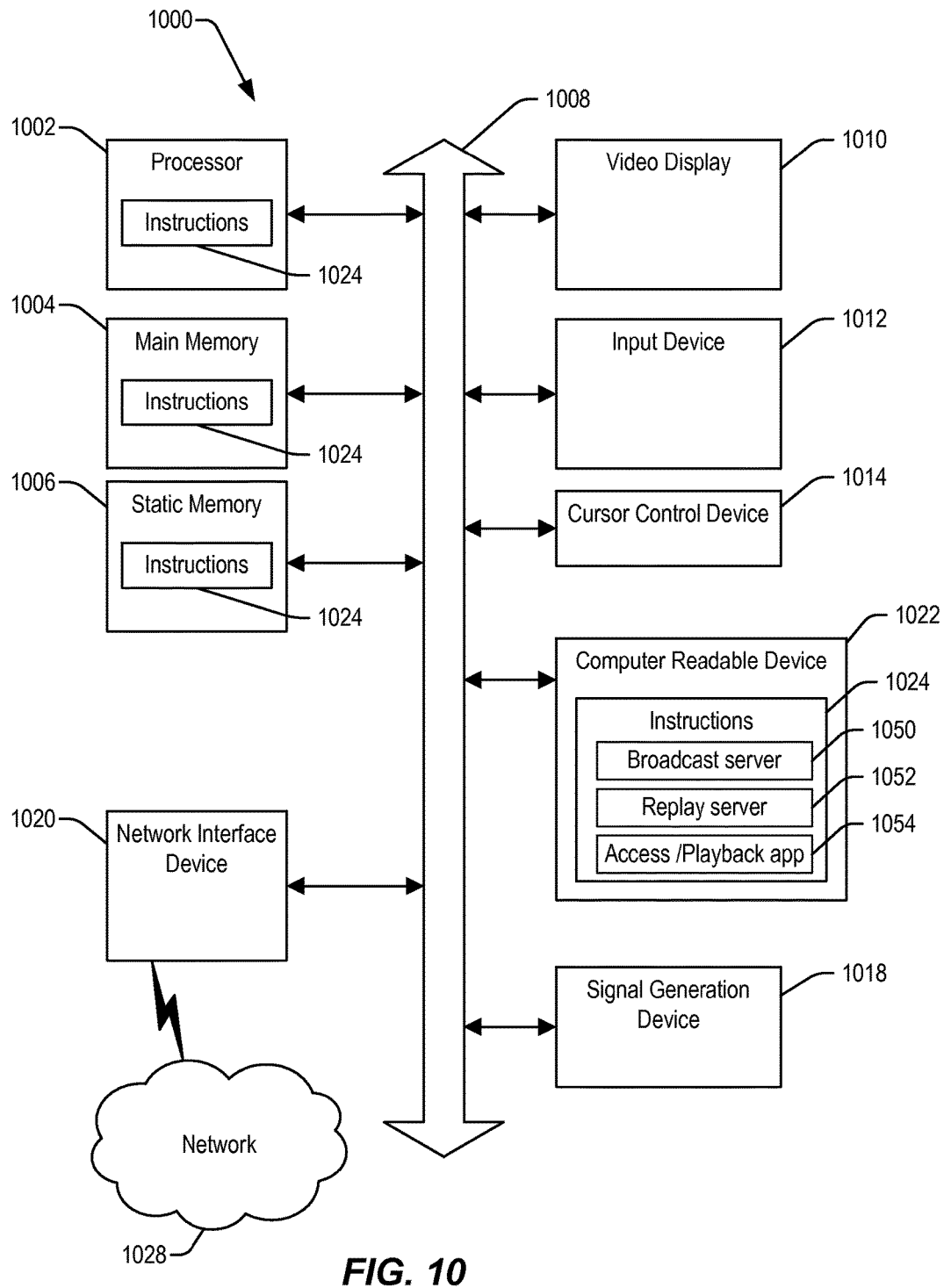
FIG. 10 is a block diagram of an example of a computer system, such as a user device or a server, of the system of FIG. 1.

FIG. 10 is a block diagram of an example of a computer system, such as a user device or a server, of the system 100 of FIG. 1. For example, the computer system 1000 of FIG. 10 may include, be included within, or correspond to the computing device 120, the media parser 122, the broadcast server 130, the replay server 140, the transaction server 170, or one of the user devices 160, 162, 164 of FIG. 1. The computer system 1000 includes a set of instructions 1024 or multiple sets of instructions that can be executed to cause the computer system 1000 to perform any one or more of the methods or computer-based functions disclosed herein. To illustrate, in an implementation in which the computer system 1000 corresponds to the first user device 160, the computer system 1000 may include a media access and playback application, such as access/playback application 1054 of FIG. 10. In an implementation in which the computer system 1000 corresponds to the computing device 120 or the broadcast server 130, the computer system 1000 may include broadcast server instructions, such as a broadcast server 1050 of FIG. 10. In an implementation in which the computer system 1000 corresponds to the computing device 120 or the replay server 140, the computer system 1000 may include replay server instructions, such as a replay server 1052 of FIG. 10.

The computer system 1000 may operate as a standalone device or may be connected, e.g., using a network 1028, to other computer systems or peripheral devices. In a networked deployment, the computer system 1000 may operate in the capacity of a server or as a client user computer in a server-client user network environment, or as a peer computer system in a peer-to-peer (or distributed) network environment. The computer system 1000 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular example, the computer system 1000 may be implemented using electronic devices that provide video, audio, or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002 (or multiple processor), e.g., a central processing unit (CPU), a graphics processing unit (GPU), or both. Moreover, the computer system 1000 may include a main memory 1004 and a static memory 1006, which can communicate with each other via a bus 1008.

The computer system 1000 may further include a video display unit 1010, such as a liquid crystal display (LCD), a light emitting diode (LED) display, a touch screen display, a flat panel display, or a solid state display. Additionally, the computer system 1000 may include an input device 1012, such as a remote control device or a keyboard, and a cursor control device 1014, such as a mouse. In some implementations, the input device 1012 and the cursor control device 1014 may be integrated into a single device, such as a capacitive touch screen input device. The computer system 1000 may also include a signal generation device 1018, such as a speaker, and a network interface device 1020. Some computer systems 1000 may not include an input device (e.g., a server may not include an input device).

In the particular example illustrated in FIG. 10, the computer system 1000 includes computer-readable storage 1022 (i.e., a computer-readable storage device) in which one or more sets of instructions 1024, e.g. software, can be embedded. The computer-readable storage 1022 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 1024 may be executable to perform operations of one or more of the methods or logic as described herein. For example, the instructions 1024 may be executable by the processor 1002 to perform one or more functions or methods described herein, such as the method 800 of FIG. 8 or the method 900 of FIG. 9. The instructions 1024 may reside completely, or at least partially, within the main memory 1004, the static memory 1006, and/or within the processor 1002 during execution by the computer system 1000.

In an alternative implementation, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 1022 that stores instructions 1024, so that a device connected to the network 1028 may communicate voice, video or data over the network 1028. While the computer-readable storage 1022 is shown to be a single device, the computer-readable storage 1022 may include a single device or multiple devices, such as a centralized or distributed database, and/or associated caches and servers that store one or more sets of instructions. The computer-readable storage 1022 is capable of storing a set of instructions for execution by a processor to cause a computer system to perform any one or more of the methods or operations disclosed herein.

In a particular non-limiting, exemplary embodiment, the computer-readable storage 1022 may include a solid-state memory such as embedded memory (or a memory card or other package that houses one or more non-volatile read-only memories). Further, the computer-readable storage 1022 may be a random access memory or other volatile re-writable memory. Additionally, the computer-readable storage 1022 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 1000 in selected embodiments.

The illustrations of the examples, particular implementations, and embodiments described herein are intended to provide a general understanding of the structure of the various embodiments. The illustrations are not intended to serve as a complete description of all of the elements and features of apparatus and systems that utilize the structures or methods described herein. Many other examples, implementations and/or embodiments may be apparent to those of skill in the art upon reviewing the disclosure. Other examples, implementations and/or embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific examples, implementations and embodiments have been illustrated and described herein, it should be appreciated that any subsequent arrangement designed to achieve the same or similar purpose may be substituted for the specific embodiments shown. This disclosure is intended to cover any and all subsequent adaptations or variations of the disclosed subject matter.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
   a processor; and
   a memory accessible to the processor, the memory storing instructions that, when executed by the processor, cause the processor to perform operations comprising:
   receiving, via a transmission, a first video stream of a plurality of video streams associated with an event;
   during display of the first video stream at a display device coupled to the processor, sending a replay request for the event, the replay request associated with a particular video stream of the plurality of video streams, wherein the replay request includes an offset time and a replay duration, and wherein a communication session with a media server is established via a unicast transmission based on the replay request;
   receiving, via the communication session, a set of video segments associated with the particular video stream responsive to the replay request; and
   displaying the set of video segments at the display device, wherein a display of the set of video segments includes information overlaying a portion of the video segments, the information including a first indicator of a channel associated with the particular video stream, a second indicator that the set of video segments is a replay, and a numeric indicator of time remaining in the replay.

2. The device of claim 1, wherein the event comprises a live event at a venue, and wherein the device is located at the venue.

3. The device of claim 1, wherein the first video stream comprises a first feed of the event from a first camera at a first position, and wherein the particular video stream comprises a second feed of the event from a second camera at a second position.

4. The device of claim 1, wherein the operations further comprise generating a user interface display that includes an option to specify the offset time and the replay duration.

5. The device of claim 1, wherein the offset time, the replay duration, or both, are default values.

6. The device of claim 1, wherein during display of the first video stream to the display device, the display device displays a selectable request replay option.

7. The device of claim 6, wherein in response to receipt of selection of the selectable request replay option, the operations further comprise sending a replay configuration interface to the display device, wherein the replay configuration interface enables entry of the offset time and the replay duration.

8. The device of claim 1, wherein during display of the first video stream to the display device, the display device displays a selectable option to select another video stream of the plurality of video streams.

9. The device of claim 8, wherein in response to receipt of selection of the selectable option to select another media stream, the operations further comprise sending an available media stream interface, wherein the available media stream interface displays thumbnail views of the video streams of the plurality of video streams.

10. The device of claim 1, wherein the display of the set of video segments includes a selectable option to cancel the replay.

11. A method comprising:
    receiving, at a portable communication device, a first video stream of a plurality of video streams associated with an event from a media server;
    during display of the first video stream at a display device of the portable communication device, sending a replay request for the event from the portable communication device to the media server, the replay request associated with a particular video stream of the plurality of video streams, wherein the replay request includes an offset time and a replay duration, and wherein a communication session with the media server is established via a unicast transmission based on the replay request;
    receiving, at the portable communication device via the communication session from the media server, a set of video segments associated with the particular video stream responsive to the replay request; and
    displaying the set of video segments at the display device, wherein a display of the set of video segments includes information overlaying a portion of the video segments, the information including a first indicator of a channel associated with the particular video stream, a second indicator that the set of video segments is a replay, and a numeric indicator of time remaining in the replay.

12. The method of claim 11, further comprising, in response to an initial request for a video stream of the video streams, receiving an event media access interface.

13. The method of claim 12, wherein the event media access interface enables entry of a ticket identifier in response to a ticket purchase including event broadcast access.

14. The method of claim 12, wherein the event media access interface enables purchase of different durations of event access, different types of event access, or both.

15. The method of claim 14, wherein the types of event access include live feeds of the event, replays of the event, or both.

16. A computer-readable storage device storing instructions executable by a processor to cause the processor to perform operations comprising:
    receiving a first video stream of a plurality of video streams associated with an event from a media server;
    during display of the first video stream to a display device coupled to the processor, sending a replay request for the event to the media server, the replay request associated with a particular video stream of the plurality of video streams, wherein the replay request includes an offset time and a replay duration, and wherein a communication session with the media server is established via a unicast transmission based on the replay request;
    receiving, via the communication session from the media server and responsive to the replay request, a set of video segments associated with the particular video stream; and
    displaying the set of video segments at the display device, wherein a display of the set of video segments includes information overlaying a portion of the video segments, the information including a first indicator of a channel associated with the particular video stream, a second indicator that the set of video segments is a replay, and a numeric indicator of time remaining in the replay.

17. The computer-readable storage device of claim 16, wherein during display of the first video stream to the display device, the display device displays a selectable request replay option.

18. The computer-readable storage device of claim 17, wherein in response to receipt of selection of the selectable request replay option, the operations further comprise sending a replay configuration interface to the display device, wherein the replay configuration interface enables entry of the offset time and entry of the replay duration.

19. The computer-readable storage device of claim 16, wherein the first video stream is received via a multicast transmission.

20. The computer-readable storage device of claim 16, wherein the particular video stream is distinct from the first video stream.

* * * * *